United States Patent [19]

Streebin et al.

[11] 3,956,126

[45] May 11, 1976

[54] APPARATUS FOR DISPOSING OF ORGANIC WASTE MATERIALS

[76] Inventors: Leale E. Streebin, 2301 Morgan Drive; Namon A. Nassef, 800 Lexington Drive, No. 108, both of Norman, Okla. 73069

[22] Filed: July 20, 1973

[21] Appl. No.: 381,052

[52] U.S. Cl. ................................ 210/104; 4/10; 4/131; 60/317; 159/1 RW; 159/DIG. 32; 202/205; 202/235; 203/DIG. 5; 210/71; 210/152; 210/179; 210/180; 210/258
[51] Int. Cl.² ...................... C02C 1/00; F01N 3/02
[58] Field of Search ............ 4/10, 131; 60/317, 320, 60/321; 210/67, 68, 71, 104, 114, 152, 175, 179, 180, 181, 183, 258; 159/1 RW, DIG. 32; 165/66; 202/205, 235; 203/25, 91, DIG. 5

[56] References Cited
UNITED STATES PATENTS

| | | | |
|---|---|---|---|
| 1,892,681 | 1/1933 | Rankin | 210/181 X |
| 3,304,991 | 2/1967 | Greenfield | 159/1 RW |
| 3,504,797 | 4/1970 | Reid | 210/152 |
| 3,622,511 | 11/1971 | Pizzo | 210/67 X |
| 3,633,746 | 1/1972 | Dietrich | 210/71 |
| 3,733,617 | 5/1973 | Bennet | 210/152 X |
| 3,757,357 | 9/1973 | Smith | 210/152 X |
| 3,764,010 | 10/1973 | Reid | 210/181 X |
| 3,775,978 | 12/1973 | Body | 210/152 X |
| 3,856,672 | 12/1974 | Boswinkle et al | 210/71 X |
| 3,868,731 | 3/1975 | Stahl et al | 4/10 |
| 3,884,194 | 5/1975 | Grosseau | 60/321 X |

*Primary Examiner*—Charles N. Hart
*Assistant Examiner*—Robert G. Mukai
*Attorney, Agent, or Firm*—Laney, Dougherty, Hessin & Fish

[57] ABSTRACT

An apparatus for efficiently disposing of combustible organic waste materials, such as organic industrial and household wastes, comprising a macerator and an evaporation unit where liquids are removed from the waste to leave a concentrated organic residue. Evaporation of liquids from the waste is accomplished by heat exchange with a medium heated, in part, by exhaust gases from an internal combustion engine, and in part by incineration of the solid, relatively dry organic residue. The liquids from the evaporation unit are preferably condensed to a suitable liquid form for subsequent use, and the concentrate remaining after liquid evaporation is introduced to a high temperature zone developed in the course of the operation of an internal combustion engine, so that the solid organic residue is incinerated to a relatively small quantity of ash and innocuous gases. Heat for the purpose of partially heating the heat exchange medium used in the evaporation unit is developed in the course of such incineration.

8 Claims, 4 Drawing Figures

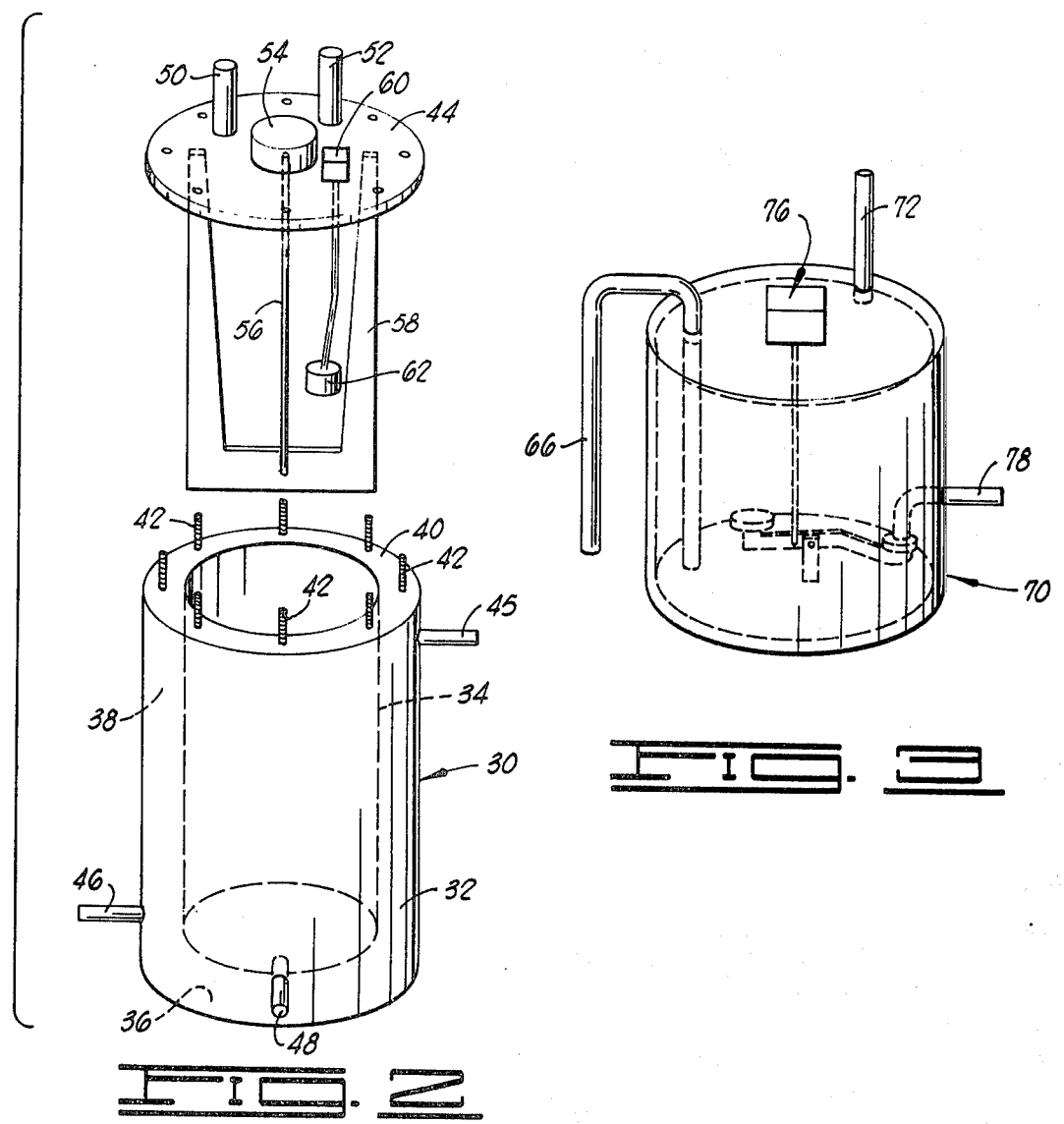
FIG. 2
FIG. 3
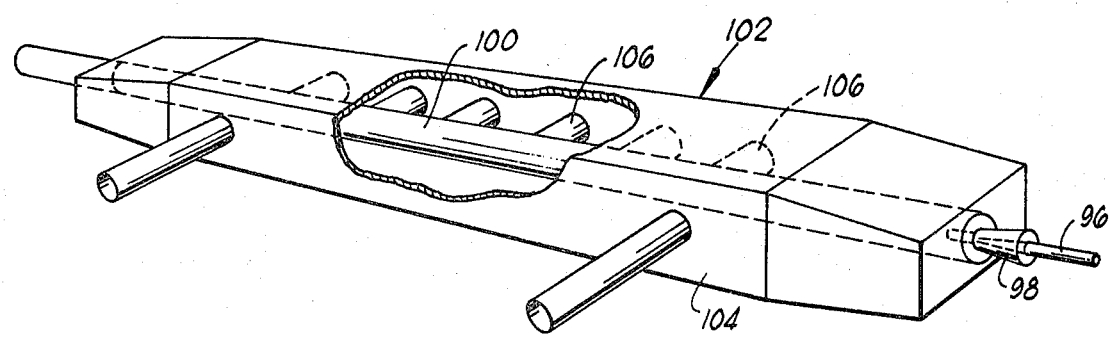
FIG. 4

APPARATUS FOR DISPOSING OF ORGANIC WASTE MATERIALS

BACKGROUND OF THE INVENTION

1. Field of the Invention

The present invention relates to an apparatus for for efficiently and ecologically satisfactorily disposing of organic waste materials which include organic solids susceptible to combustion, and including household and organic industrial wastes. More particularly, the invention relates to a method of employing the heat developed and exhausted during the operation of an internal combustion engine for the purpose of efficiently disposing of organic waste materials of the type described.

2. Brief Description of the Prior Art

Social concern for the manner in which industry, as well as family units, dispose of organic wastes generated from time to time by the industry or in the household has intensified in recent times as concern for the contamination and pollution of man's environment has deepened. The materials which may be discarded, or which must be necessarily gotten rid of in some way, or reclaimed, include both organic and inorganic substances, and various proposals have been advanced to alter, or to completely eliminate, time worn methods of disposal, so that harmful by-products of the disposal process are not generated and released to the natural environment, and where possible, conservation of valuable constituents of the waste material is achieved.

In one area of concern relating to the subject of disposal of wastes, household wastes in the form of human excrement, as well as organic garbage wastes, have received attention. Although in the past, chemical treatments which rendered the waste materials innocuous to humans, followed by discharge to natural streams or to the air, were considered acceptable methods of disposition, such methods are no longer considered generally satisfactorily where the effluent products of the treatment are deleterious to natural flora and fauna other than man. Moreover, the efficiencies of chemical treatments have, in many cases, become inadequate, and new methods of disposal of these types of organic waste have been sought.

The problem of satisfactorily disposing of household wastes, such as sewage and garbage, has been an especially serious one where the wastes are generated on such vehicles or conveyances as ships, boats, house trailers or mobile homes, Here, no permanent sewage system connected to mains or the like can generally be provided, and a portable, efficient disposal system is needed. On some marine vessels, the waste is simply thrown overboard in flagrant disregard of clean water considerations. In some cases, septic type holding systems have been employed, with chemical treatment of the sewage being effected so that relatively innocuous masses of material may ultimately be discharged when the vessel or vehicle has reached a point in its sailings or travel where such discharge can be legally and safely effected. In other cases, attempts have been made to convert the sewage and garbage thermally to products which are non-polluting with respect to the atmosphere, or to bodies of water. As illustrative of efforts which have been made in the direction of thermal conversion of organic waste materials developed during the occupation and use of vehicles and vessels, the systems described in U.S. Pat. No. 3,616,913 to Reid, in U.S. Pat. No. 3,622,511 to Pizzo, and in U.S. Pat. No. 3,673,614 to Claunch may be mentioned.

The Reid system described in U.S. Pat. No. 3,616,913 constitutes the culmination of an effort extending over several years by Reid to use heat in the exhaust gases from an internal combustion engine to purify the liquid portion of sewage and kitchen garbage so as to permit the water content thereof to be conserved, and convert any solids entrained in the liquid to innocuous materials which may be discharged with the exhaust gases. In this most recent of several patents issued to Reid in this field, a boiler is provided into which the liquid content from the waste materials is first directed for purposes of evaporation as a result of heat exchange with the hot gases exhausted from an internal combustion engine. The residue, which contains some organic material, continues to accumulate in the boiler over an extended period of time. To the end of cleaning the boiler by elimination of this organic residue, means is provided for permitting air to be drawn into the boiler periodically, wherein, in conjunction with the very high temperatures prevailing therein, the accumulated solid organic material coating the boiler is burned. The fine ash which then remains is swept out of the boiler through a conduit, and is merged with the exhaust gases from the engine and vented to the atmosphere.

The main solid material constituting a major portion of the human wastes or garbage generated in the course of use of the vehicle to which the Reid system is attached is passed initially into a septic tank, where the material, before, or concurrently with, the removal of the liquids therefrom for passage to the described boiler, is treated with chemicals by conventional procedure, and is rendered innocuous by such treatment. The solid material which remains after such chemical treatment is periodically cleaned out of the septic tank at times and locations where such solids removal is legal and convenient.

In Pizzo U.S. Pat. No. 3,622,511, a compact mechanical system is described which is employed for treating sewage, and is suitable for use on small ships. Here, the sewage is first macerated and then sent to an evaporator where a submersible burner drives off the liquid content of the sewage and concentrates the solids. The vaporized liquids are passed to a condenser and after condensation, can be separated and utilized in several optional ways. The concentrated solids from the evaporator, present as a pumpable sludge, are pumped to a sludge incinerator device where the solids are burned with a suitable fuel which reduces the solid organic material to ash and carbon dioxide. The effluent from the incinerator is passed through a water spray to remove ash particles prior to exhausting the effluent gases to the atmosphere. The fuel for the evaporator submerged burner, and also for the incinerator, can be diesel oil of the type provided on the vessel where the system is used.

BRIEF DESCRIPTION OF THE PRESENT INVENTION

The present invention provides an apparatus or system for efficiently disposing of organic waste materials, including sewage and garbage. Broadly described, the invention comprises directing the waste material to an evaporator where the liquid content of the waste material is evaporated by the use of a suitable heat exchange medium. The heat exchange medium is heated by exhaust gases from an internal combustion engine, and also by the heat of combustion developed by burning in the hot exhaust gases from the engine, substantially all of the solid residue remaining in the evaporator after the water has been removed therefrom. In this way, the system of the present invention utilizes the thermal energy content of the combustible organic materials in the solid residue remaining after evaporation of the liquid for the purpose of providing a part of the heat needed to heat the heat exchange medium used to evaporate liquids from the waste being treated.

In a more specific and detailed embodiment of the invention, the waste material, containing predominately organic solid material and water, is directed through a macerater for the purpose of reducing the particle size of the solid waste material, and is then passed to an evaporator unit. In this unit, a heat exchange medium, such as glycerin or the like, is passed through the evaporator in heat exchange relation with the waste material so that liquids in the waste material are evaporated, and are taken overhead from the evaporator unit. Upon achieving sufficient liquid content reduction of the total waste material, the organic solid residue which remains as a pumpable slurry is pumped to a combustion zone which is provided in proximity to an internal combustion engine so as to utilize the hot exhaust gases from the engine to provide the heat of combustion. At this same location, a heat exchanger is provided for circulating the heat exchange fluid used in the evaporator device in heat exchange relation with the hot exhaust gases and the burning organic residual materials. The liquid from the evaporator device are recondensed, and where water is the primary condensed liquid, and is derived from a water closet flush tank or other similar source, can be recycled for re-utilization at such location. In any event, the liquids are purified by the evaporation process, and can be innocuously discharged if desired. The products of combustion of the solid organic residue constitute a small amount of ash and carbon dioxide and water, and can be introduced to the hot exhaust gases discharged to the atmosphere from the exhaust pipe of the engine. The combustion products do not unsatisfactorily pollute the atmosphere.

From the foregoing general description of the invention, it will have become apparent that it is an important object of the present invention to provide a waste disposal system which can be used in conjunction with an internal combustion engine for effectively and efficiently disposing of sewage and garbage organic waste materials.

Another object of the invention is to provide a compact portable system which can be integrated with the waste generating systems of boats and automobiles, and with the engines used on such vehicles, to permit the wastes which are generated to be continuously reduced to innocuous products, and the re-usable constituents of the wastes, such as water, to be reclaimed and reused safely.

Another object of the invention is to provide a system of the general type which disposes of organic sewage by using heat derived from an internal combustion engine, in which system, the efficiency of disposal is enhanced by employing the heat of combustion of combustible organic compounds in the waste material to effectively evaporate and reclaim liquids forming a portion of the raw waste material.

A further object of the invention is to provide an apparatus for the disposal of human wastes received from water closets, sinks and showers, in addition to other similar disposable waste products from the preparation and consumption of food.

Another object of the invention is to provide a waste disposal apparatus which can be used on water-borne vessels with inboard engines, recreational vehicles or other types of vehicles which provide a heat and power source from which waste thermal energy is employed in the treating of the waste material.

Additional objects and advantages of the invention will become apparent as the following detailed description of a preferred embodiment of the invention is read in conjunction with the accompanying drawings which illustrate the invention.

BRIEF DESCRIPTION OF THE DRAWINGS

FIG. 2 is an exploded detail view of the evaporator unit utilized in the present invention, and showing portions of the unit in section.

FIG. 3 is a perspective view of a condensing unit utilized in the system of the invention.

FIG. 4 is a perspective view, with parts broken away, of the heat exchange device and solids combustion chamber forming a part of the system of the present invention, and used in carrying out the method of the invention.

DETAILED DESCRIPTION OF A PREFERRED EMBODIMENT OF THE INVENTION

Figure 1:
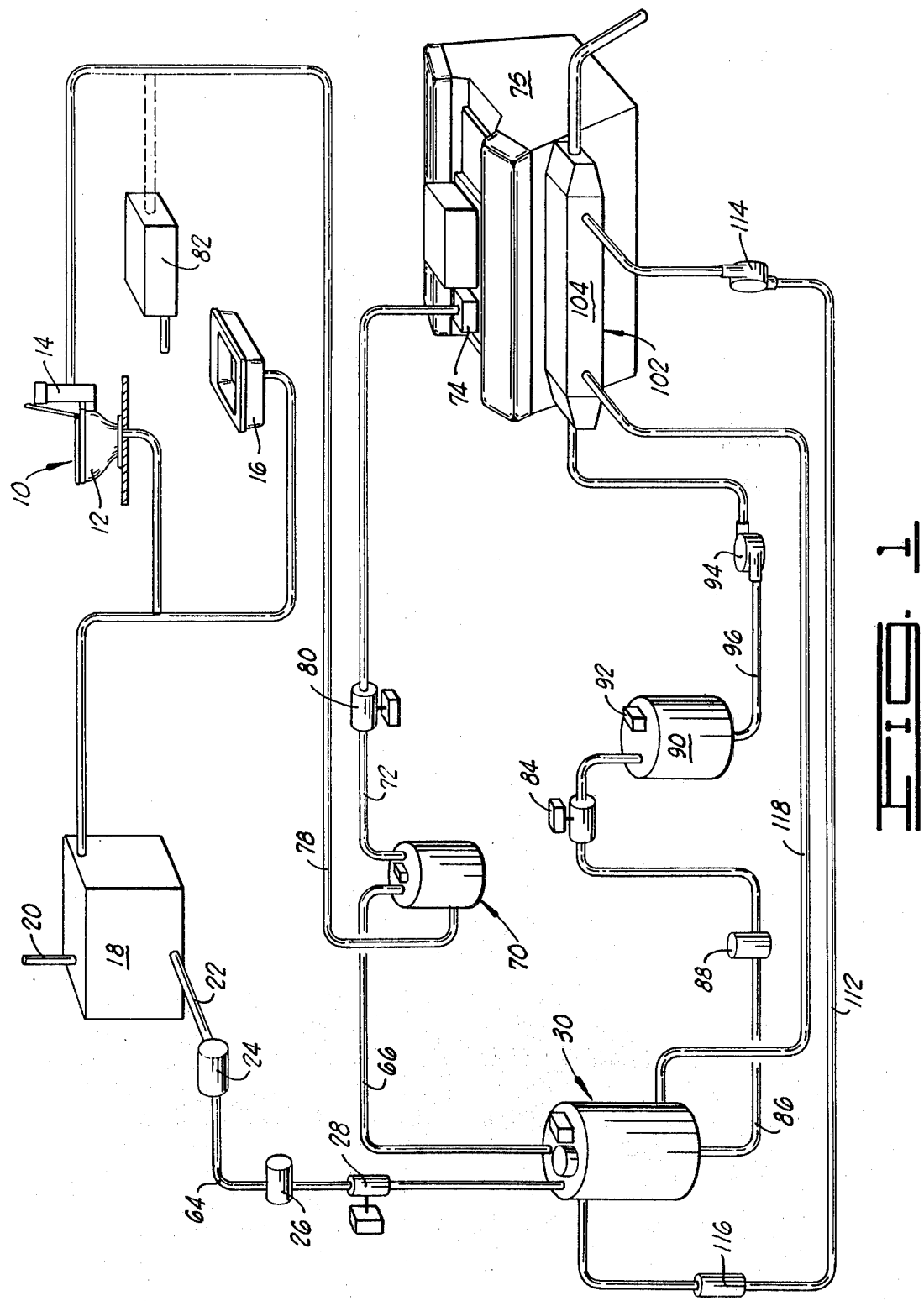
FIG. 1 is a process flow diagram depicting, in general form, the various elements of the system or apparatus employed in the present invention, and the method by which these elements are employed in sequence for processing and disposing of organic wastes.

Referring initially to FIG. 1 of the drawings, the system of the present invention is shown as it may be utilized in an internal combustion engine powered conveyance having living accommodations on the conveyance. There is thus shown a water closet 10 which includes a commode 12 and tank 14. Also provided is a galley sink 16 which, it will be assumed, is provided with a small macerating device so that garbage and other wastes can be fed through the macerating device with the regular waste water drainage from the sink.

The slurried solid organic wastes from the water closet 10 and from the galley sink 16 are discharged through suitable conduits to a holding tank 18 provided with a suitable vent 20. A discharge conduit 22 carries the slurry of organic wastes from the holding tank 18 to a large macerator pump 24 where the organic solid material is thoroughly subdivided and reduced in particle size. The slurry is then pumped from the macerating pump 24 through a particle control device 26 and through a solenoid actuated control valve 28 to an evaporator unit designated generally by reference numeral 30.

The evaporator unit 30 is shown in greater detail in FIG. 2 and includes an outer cylindrical shell 32 and a concentrically arranged, inner cylindrical shell 34. The shells 32 and 34 are closed at one end by a common bottom plate 36 and define between them an annulus 38 which is closed at the other end of the two shells by an annular plate 40. Projecting upwardly from the annular plate 40 are a plurality of threaded securing bolts 42 utilized to hold a top plate 44 in position as hereinafter described. A heat exchange fluid is introduced to the annulus 38 through an intake fitting 45 and is discharged from the annulus through a discharge fitting 46. A concentrated waste discharge conduit 48 extends from the bottom of the evaporator unit and communicates with the interior of the internal cylindrical shell 34.

Secured to the cover plate 44 are a sewage inlet fitting 50 and a vapor removal port 52. These fittings are arranged to communicate through the cover plate 44 with the interior of the inner cylindrical shell 34. The cover plate 44 also carries thereon, a stirrer motor 54 which drives a shaft 56 projecting down coaxially into the internal shell 34 and secured at its lower end to a stirrer paddle 58 for cleaning the interior side walls of the inner cylindrical shell. Finally, there is provided on the cover plate 44, a liquid level control switch 60 which is connected to an associated float element 62 below the cover plate and positioned for location in the inner shell 34 of the evaporation unit 30. The conduit 64 from the macerator pump 24, after extending through the particle control device 26 and the valve 28, is connected to the fitting 50 of the evaporator unit 40 for the purpose of charging macerated water-organic waste to the evaporator unit. The vaporized liquid from the evaporator unit 30 is discharged through the port 52 into a conduit 66 connected to a condensing unit 70.

The condensing unit 70 is connected by a conduit 72 to a vacuum source, such as the intake manifold 74 of an internal combustion engine 75, which is utilized in a preferred embodiment of the invention and shown in FIG. 1 of the drawings. The vapor from the evaporator unit 30 is thus drawn into the condensing unit 70, the vapor is condensed, and the liquid level within the condensing unit rises. As the condensate level in the condensing unit 70 is increased, a liquid level control switch and valve 76 open a flush tank return line 78, and close the vacuum conduit 72 by closing a solenoid valve 80. Water accumulated in the condensing unit 70 is thus returned via the return line 78 to the flush tank 14 of the water closet 10, and may be delivered by gravity flow or, if needed, a pump (not shown) can be incorporated in the conduit 78 and actuated in response to the selected liquid level within the condensing unit 70 concurrently with the level control switch and valve 76. It should be here pointed out that as an alternate method of disposal of the condensate from the condensing unit 70, the condensate could be passed through suitable chlorinators and charcoal filtration devices to further purify the water, and the water then stored in a fresh water supply tank 82 as an alternate to returning the water to the flush tank 14.

With the removal of liquid from the macerated organic wastes, the liquid level in the evaporator unit 30 falls and the liquid level control switch 60 then closes the solenoid valve 80 and opens a solenoid valve 84 to allow the concentrated waste to flow in a conduit 86 through a particle control device 88 into an injector vessel 90. When the level of the concentrated slurry in the evaporation unit 30 falls to a predetermined minimum level, the level control switch 60 is actuated by the float element 62, and functions to close the solenoid valve 84 and open the solenoid valves 28 and 80, and also to start the macerator pump 24. The cycle of filling and emptying of the evaporator unit 30 is then repeated until the holding tank 18 is empty, or the energy source is cut off.

In the injector vessel 90, a float element (not shown) causes a level control switch 92 to close and start an injector pump 94. The injector pump 94 delivers the slurry of organic waste, highly concentrated in solids, through the conduit 96 into an injector nozzle 98. The injector nozzle 98 injects the slurry under pressure into a thermal combustion chamber 100 forming a portion of a heat exchange and solids combustion assembly, designated generally by reference numeral 102. The combustion chamber 100, in the illustrated embodiment of the invention, is an elongated cylindrical chamber positioned within a heat exchange jacket 104 which extends around the combustion chamber on all sides thereof, and having closed opposite ends. The heat exchange and solids combustion assembly 102 further includes a plurality of pipes or ducts 106 placing the combustion chamber 100 in direct communication with the exhaust ports from the cylinders of the internal combustion engine 75, so that very hot exhaust gases and flames from the exhaust ports of the engine are passed into the combustion chamber, and the exhaust gases flow from this chamber into an exhaust pipe.

For the purpose of circulating a heat exchange medium between the heat exchange and combustion assembly 102 and the evaporator unit 30, a conduit 112, having a suitable pump 114 positioned therein, and also passing through an emergency pressure relief valve 116, functions to convey hot heat exchange medium from the interior of the heat exchange jacket 104 to the intake fitting 45 of the evaporator unit. The heat exchange medium is returned from the evaporator unit 30 to the interior of the heat exchange jacket 104 via a conduit 118.

When a pre-selected minimum level of concentrated waste slurry is reached in the injector vessel 90, the level control switch 92 functions to stop the operation of the injector pump 94. No further injection of the slurry then occurs unit the level of slurry within the injector vessel 90 has again reached a pre-selected height therein. The cycle is then repeated.

OPERATION

In the operation of the system of the present invention for disposing of organic waste materials, such materials, as derived from a typical point of origin or source, such as the water closet 10 and the galley sink 16, are first passed into a suitable holding tank or other location suitable for detention in order to impart flexibility to the demands of the disposal system. Waste withdrawn from the holding tank 18 is then macerated as may be needed to convert the solids particles of the waste into finely pulverized or particulate form. The waste can be further passed through a particle control device to assure that the particle sizes of waste materials from the holding tank 18 to the evaporator unit 30 is effectively controlled.

In the evaporator unit 30, the highly heated heat exchange medium derived from the heat exchange and combustion assembly 102 is circulated through the evaporator unit 30 and functions to vaporize the liquid content of the macerated organic waste charged to the evaporator unit from the holding tank. This results in concentration of the solids content of the waste until it is a thick pumpable slurry. The vapor generated in the evaporator unit 30 is passed overhead to the condensing unit 70 where it is condensed. The condensate is periodically withdrawn from the condensing unit 70 and, depending upon the employment of further purification procedures, or the end use sought, may be recycled to the water closet tank 14, to a storage tank 82 or simply disposed of to the surrounding environment without concern for pollution.

The slurry in the evaporator unit 30, which slurry is highly concentrated in organic solids, is periodically removed from that unit and passed to the injector vessel 90. The slurry from the injector vessel 90 is periodically pumped through the injector nozzle 98 into the combustion chamber 100 forming a portion of the heat exchanger and combustion assembly 102. The flames and hot exhaust gases from the cylinders of the internal combustion engine 75 provide a high temperature environment within the combustion chamber 100 which is sufficiently hot to ignite and burn the solids in the slurry injected into the combustion chamber, and to convert the solids to inert ash, water vapor and innocuous gases. These products of combustion are vented to the atmosphere with the exhaust gases of the internal combustion engine.

In undergoing burning, the solid residue injected into the combustion chamber 100 through the injector nozzle 98 contributes heat to the heat exchange medium which circulates around the combustion chamber within the heat exchange jacket 104. The heat exchange medium preferably undergoes substantially continuous circulation through the evaporator unit 30, and is used to reduce the liquid content of the raw organic waste material introduced to this unit.

In a test of a portion of the apparatus of this invention, a 170 cubic inch Ford internal combustion engine was modified by replacing the exhaust manifold with a shell type heat exchanger and combustion assembly corresponding to the heat exchanger and combustion assembly 102 shown in the drawing. The exhaust from the heat exchanger and combustion assembly 102 was passed into a 55 gallon drum of water so that the exhaust gases traversed the entire body of water from the bottom of the drum to the top. Prior to the commencing the test, the engine was warmed up and a load of approximately 26 horsepower was applied at an engine speed of 2400 rpm. When the engine was running at this speed after warm-up, a concentrated organic waste material of typical domestic waste was continuously injected into the combustion chamber of the heat exchanger and combustion assembly at a rate of one liter of the waste slurry per minute. A total of 3 liters of waste was injected over a period of 3 minutes per test run.

In the course of the tests, the temperature of glycerine used as a heat exchange medium and circulated in the heat exchanger shell 104 was measured and determined to be between 330° and 350°F under a pressure of 35 to 45 psi. From engineering data available on the engine in use, the temperature in the exhaust flame zone within the combustion chamber 100 was determined to be between 1000° and 1300°F.

Upon completion of injection of all the waste into the combustion chamber, samples were taken from the 55 gallon drum of water through which the exhaust gases had been passed. These samples were analyzed for total organic carbon, and the analysis results were compared with similar analyses carried out prior to the commencement of injection of the organic wastes. These comparative tests showed that greater than 98 percent of the organic carbon in the waste was converted to gaseous materials which did not remain in the water in the drum.

From the foregoing description of the invention, it will be perceived that the present invention comprises a highly useful, self-contained waste disposal system which can convert household and industrial organic wastes to innocuous products in a highly efficient and effective manner. The system is compact in form and its several components are relatively simple. The system can be easily incorporated in existing internal combustion engine motive systems of many types of large conveyances.

Although a specific embodiment of the invention has been herein described, it will be understood that various changes and innovations in the described system and in the particular structural components thereof, can be effected without departure from the basic principles which underlie the invention. Thus, in some instances, it may not be necessary to use the macerator pump employed in the present invention, nor may a holding system or device of any type be required, but rather, finely divided organic waste raw material may be passed directly to the evaporator device 30. It is also possible, with some types of wastes having a very low water content, to inject the solid waste material directly into the combustion chamber of the heat exchanger and combustion assembly 102 without prior evaporation of a portion of the liquid content of such wastes. An important feature of the present invention, as it is intended for primary use, however, is the derivation of a portion of the thermal content of the heat exchange medium used in the evaporator unit from the burning of a part of the solid organic residue remaining after reduction of the liquid content of the raw waste material.

Other changes and innovations of structure and mode of usage will occur to those skilled in the art after having become cognizant of the basic principles which underlie the present invention, and it is considered that changes and modifications which continue to rely upon these basic principles are within the spirit and scope of the invention, except as the same may be necessarily limited by the appended claims or reasonable equivalents thereof.

What is claimed is:

1. Apparatus for disposing of water-containing waste materials comprising:

means for macerating the organic waste materials;

an evaporator unit for removing water from the waste materials;

means for conveying macerated organic waste materials to said evaporator unit;

heat exchange means for heating waste materials in the evaporator unit to remove water therefrom by elevating the temperature of the water above its boiling point;

an internal combustion engine having an intake manifold;

a condensing unit for condensing steam from said evaporator unit and connected to said intake manifold;

means for moving steam from said evaporator unit to said condensing unit;

a combustion chamber connected to said engine for receiving hot gases therefrom to incinerate organic solids therein;

means for conveying organic solids from the evaporator unit to said combustion chamber after water has been removed from the waste;

a heat exchange and combustion assembly including said combustion chamber for heating a non-aqueous heat exchange medium with heat generated upon combustion of organic solids in said combustion chamber; and means for conveying said non-aqueous heat exchange medium from said assembly to said heat exchange means.

2. Apparatus as defined in claim 1 and further characterized as including means for controlling the level of solids and liquids in said evaporator unit.

3. Apparatus as defined in claim 1 wherein said combustion chamber is a cylindrical member extending along said internal combustion engine and having the exhaust ports of the cylinders of said engine discharging radially into said cylindrical member at axially spaced points therealong.

4. Apparatus as defined in claim 3 wherein said means for conveying organic solids to the combustion chamber comprises:

an injection nozzle for injecting the organic solids into said combustion chamber;

conduit means for passing the organic solids from the evaporator to said injection nozzle; and a pump positioned in the conduit.

5. In a conveyance powered by an internal combustion engine which includes an intake manifold and an exhaust manifold, and which conveyance includes sanitary facilities discharging solid organic waste mixed with water, the improvement which comprises:

means for macerating the solid organic waste;

an evaporator unit for removing water from the waste-water mixture by heating the water above its boiling point;

means for conveying macerated organic waste materials to said evaporator unit;

a condensing unit connected between said intake manifold and said evaporator unit for receiving and condensing steam drawn from said evaporator unit into said condensing unit by the vacuum developed by said intake manifold;

a combustion chamber at the locus of the engine exhaust manifold and having the exhaust ports of the cylinders of the engine discharging into said combustion chamber;

means for conveying de-watered organic solids from the evaporator unit to said combustion chamber after water has been removed from the mixture by the evaporator unit; and means for circulating a non-aqueous heat exchange medium from said combustion chamber to evaporator unit to use the heat of combustion of organic solids in the combustion chamber and of the exhaust gases from the engine to heat water in the mixture in said evaporating unit above its boiling point.

6. The improvement defined in claim 5 wherein said combustion chamber comprises a cylindrical member extending along said internal combustion engine and having the exhaust ports of the cylinders of said engine discharging radially into said cylindrical member at axially spaced points therealong.

7. The improvement defined in claim 6 wherein said means for conveying organic solids from the evaporator to said combustion chamber comprises:

means for periodically accumulating organic solids and periodically discharging organic solids;

first conduit means for passing the organic solids from the evaporator to said accumulating means;

an injection nozzle for injecting the organic solids into said combustion chamber;

second conduit means for passing organic solids from said accumulator means to said injection nozzle; and a pump positioned in said second conduit means.

8. Apparatus as defined in claim 7 and further characterized as including means for controlling the level of solids and water in said evaporator unit.

* * * * *